(12) United States Patent
Guo et al.

(10) Patent No.: US 11,524,558 B2
(45) Date of Patent: Dec. 13, 2022

(54) VEHICLE WINDOW, GLASS STRUCTURE AND ADJUSTMENT METHOD THEREOF

(71) Applicant: SAINT-GOBAIN GLASS FRANCE, Courbevoie (FR)

(72) Inventors: Xiaofeng Guo, Shanghai (CN); Siteng Ma, Shanghai (CN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 101 days.

(21) Appl. No.: 17/056,691

(22) PCT Filed: Sep. 25, 2019

(86) PCT No.: PCT/CN2019/107758
§ 371 (c)(1),
(2) Date: Nov. 18, 2020

(87) PCT Pub. No.: WO2020/082967
PCT Pub. Date: Apr. 30, 2020

(65) Prior Publication Data
US 2021/0206241 A1 Jul. 8, 2021

(30) Foreign Application Priority Data
Oct. 23, 2018 (CN) .......................... 201811237740.1

(51) Int. Cl.
*B60J 3/04* (2006.01)
*B60J 1/20* (2006.01)
(Continued)

(52) U.S. Cl.
CPC . *B60J 3/04* (2013.01); *B60J 1/20* (2013.01); *B60R 16/023* (2013.01);
(Continued)

(58) Field of Classification Search
CPC ...................................................... G02F 1/1313
See application file for complete search history.

(56) References Cited

U.S. PATENT DOCUMENTS 9,895,864 B2 * 2/2018 Dixon ............... B32B 17/10532
2012/0157611 A1 * 6/2012 Katami ...................... C09J 7/10
524/558

(Continued)

FOREIGN PATENT DOCUMENTS

CN 101414064 A 4/2009
CN 103991366 A 8/2014
(Continued)

OTHER PUBLICATIONS

International Search Report as issued in International Patent Application No. PCT/CN2019/107758, dated Dec. 31, 2019.

*Primary Examiner* — Sang V Nguyen
(74) *Attorney, Agent, or Firm* — Pillsbury Winthrop Shaw Pittman LLP

(57) ABSTRACT

A glass structure includes a glass body; a modulating unit coupled to the glass body to modulate optical characteristics of the glass structure; an interaction unit coupled to the glass body to provide an adjusting signal indicating an execution of adjusting the optical characteristics of the glass structure; and a control unit coupled to the modulating unit and the interaction unit respectively, the control unit being configured to receive the adjusting signal from the interaction unit and to control the modulating unit to modulate the optical characteristics of a target region of the glass structure in response to the adjusting signal. The interaction unit and the modulating unit are isolated from each other by a filling material having a transmittance equal to or greater than about 50%, a relative permittivity equal to or less than about 10, and a thickness equal to or greater than about 50 μm.

21 Claims, 7 Drawing Sheets

(51) Int. Cl.
  *B60R 16/023*   (2006.01)
  *G02F 1/01*   (2006.01)
  *G02F 1/13*   (2006.01)
  *G02F 1/133*   (2006.01)
  *G02F 1/1334*   (2006.01)
(52) U.S. Cl.
  CPC .......... *G02F 1/0121* (2013.01); *G02F 1/1313* (2013.01); *G02F 1/1334* (2013.01); *G02F 1/13306* (2013.01)

(56) References Cited

U.S. PATENT DOCUMENTS

| | | | |
|---|---|---|---|
| 2014/0027433 A1* | 1/2014 | Lisinski | B60S 1/026 |
| | | | 219/203 |
| 2015/0151613 A1 | 6/2015 | Weng | |
| 2016/0354963 A1* | 12/2016 | Zhang | B29C 45/14778 |
| 2017/0212210 A1* | 7/2017 | Chen | G01S 5/0226 |
| 2019/0278115 A1* | 9/2019 | Khan | G02F 1/133305 |

FOREIGN PATENT DOCUMENTS

| | | | | |
|---|---|---|---|---|
| CN | 105667266 | * | 6/2016 | ................ B60J 3/04 |
| CN | 105667266 A | | 6/2016 | |
| CN | 107132677 A | | 9/2017 | |
| CN | 107458189 A | | 12/2017 | |
| CN | 107608599 | * | 1/2018 | ................ B60J 1/20 |
| CN | 107608599 A | | 1/2018 | |
| JP | H06-72150 A | | 3/1994 | |

\* cited by examiner

| Driving voltage/ V | Haze | Visual effect of picture |
|---|---|---|
| 45 | 9% | |
| 40 | 10.5% | |
| 35 | 12.1% | |
| 30 | 14.5% | |
| 25 | 20.3% | |

# VEHICLE WINDOW, GLASS STRUCTURE AND ADJUSTMENT METHOD THEREOF

CROSS-REFERENCE TO RELATED APPLICATIONS

This application is the U.S. National Stage of PCT/CN2019/107758, filed Sep. 25, 2019, which in turn claims priority to Chinese patent application number 201811237740.1 filed Oct. 23, 2018. The content of these applications are incorporated herein by reference in their entireties.

TECHNICAL FIELD

The disclosure relates to a glass structure, a method of adjusting optical characteristics of the glass structure, a vehicle window, a related computing device and a related machine readable storage medium.

BACKGROUND TECHNOLOGY

Conventional glass structures used for windows, in order to achieve the purpose of shading and privacy protection, are usually equipped with shading parts such as curtains or rollers. The shielding parts need manual operation or motor control, which are easy to be damaged and need frequent maintenance.

With regard to conventional glass structures used for vehicle windows (including sunroof), a sunshield is installed inside the cabin of the vehicle to prevent sunshine from dazzling. The sunshield can be turned down when it is used, and turned up when it is not in use. However, the operation of flipping the sunshield requires a certain amount of time, that is to say, it takes time to switch between a transparent state and a shielding state. The sunshield itself needs to take up limited space inside the car. The sunshield has a certain weight, which increases the weight of the vehicle, thereby increasing fuel consumption. Moreover, when the driver operates the sunshield, he or she will be distracted and thus there are potential safety hazards.

SUMMARY

In view of the above problems in the prior art, one aspect of the disclosure relates to a glass structure comprising: a glass body; a modulating unit coupled to the glass body and configured to modulate optical characteristics of the glass structure; an interaction unit coupled to the glass body and configured to provide an adjusting signal which indicates an execution of adjusting the optical characteristics of the glass structure; and a control unit coupled to the modulating unit and the interaction unit respectively, the control unit being configured to receive the adjusting signal from the interaction unit and to control the modulating unit to modulate the optical characteristics of a target region of the glass structure in response to the adjusting signal; wherein the interaction unit and the modulating unit are isolated from each other by a filling material arranged therebetween, a transmittance of the filling material is equal to or greater than about 50%, the relative permittivity of the filling material being equal to or less than about 10, and the thickness of the filling material being equal to or greater than about 50 μm.

According to an embodiment of the disclosure, the glass structure further comprises: a detecting unit configured to detect environmental parameters and to provide a detection signal, which indicates the environmental parameters, to the control unit, wherein the control unit is further configured to determine whether a first condition, which is adapted to indicate that the interaction unit is disabled, is satisfied, if the result of the determining step for the first condition is negative, the control unit controls the modulating unit to modulate the optical characteristics of the target region of the glass structure in response to the adjusting signal; and if the result of the determining step for the first condition is affirmative, the control unit controls the modulating unit to modulate the optical characteristics of the target region of the glass structure in response to the detection signal.

According to an embodiment of the disclosure, in the condition that the control unit determines that the first condition is satisfied, the control unit is further configured to determine whether a second condition, which is adapted to indicate that the interaction unit is enabled, is satisfied, if the result of the determining step for the second condition is negative, the control unit controls the modulating unit to modulate the optical characteristics of the target region of the glass structure in response to the detection signal, and if the result of the determining step for the second condition is affirmative, the control unit controls the modulating unit to modulate the optical characteristics of the target region of the glass structure in response to the adjusting signal.

According to an embodiment of the disclosure, the modulating unit further comprises an electronically-controlled dimming unit, and the control unit is configured to in response to the adjusting signal, apply an electrical signal to the electronically-controlled dimming unit to change the optical characteristics of the electronically-controlled dimming unit such that the optical characteristics of the target region of the glass structure are adjusted.

According to an embodiment of the disclosure, the control unit is configured to execute at least one of: applying an electrical signal which is varied continuously to the electronically-controlled dimming unit such that the optical characteristics of the target region of the glass structure are adjusted continuously; applying an electrical signal which is varied in a stepwise manner to the electronically-controlled dimming unit such that the optical characteristics of the target region of the glass structure are adjusted in the stepwise manner; and applying an electrical signal with a predetermined amplitude to the electronically-controlled dimming unit such that that the optical characteristics of the target region of the glass structure are adjusted to the predetermined amplitude.

According to an embodiment of the disclosure, the electronically-controlled dimming unit comprises one or more of a polymer dispersed liquid crystal (PDLC) unit, a suspended particle device (SPD) unit and an electrochromism (EC) unit.

According to an embodiment of the disclosure, an edge of the electronically-controlled dimming unit is sealed by an isolation material, and the isolation material is selected from one or more of polyethylene terephthalate (PET), polyvinyl chloride (PVC), polyethylene (PE) and poly tetra fluoroethylene (PTFE).

According to an embodiment of the disclosure, the glass body comprises a first glass substrate and a second substrate, and the modulating unit and the interaction unit are arranged between the first glass substrate and the second substrate.

According to an embodiment of the disclosure, the glass structure further comprises: a first adhesive layer arranged between the first glass substrate and the modulating unit; and a second adhesive layer arranged between the second glass substrate and the interaction unit.

According to an embodiment of the disclosure, a portion or the entire first adhesive layer is tinted; and/or a portion or the entire second adhesive layer is tinted.

According to an embodiment of the disclosure, the interaction unit comprises any one or more of a touching device, an optical sensor, a gesture sensor, an audio sensor, an operation button and an operating handle.

According to an embodiment of the disclosure, the detecting unit comprises any one or more of an optical sensor and a temperature sensor.

According to an embodiment of the disclosure, the first condition being satisfied comprises any one or more of: receiving a first triggering signal, which indicates that the interaction unit is disabled, from the interaction unit; receiving a detection signal, the intensity of which reaches a predetermined intensity, from the detecting unit; and not receiving the adjusting signal for a predetermined period from the interaction unit.

According to an embodiment of the disclosure, the second condition being satisfied comprises: receiving a second triggering signal, which indicates that the interaction unit is enabled, from the interaction unit.

According to an embodiment of the disclosure, the optical characteristics of the glass structure comprise one or more of a haze of the glass structure, a transmittance of the glass structure and a tint of the glass structure.

Another aspect of the disclosure relates to a glass structure comprising: a glass body; a modulating unit coupled to the glass body and configured to modulate optical characteristics of the glass structure; an interaction unit coupled to the glass body and configured to provide an adjusting signal which indicates an execution of adjusting the optical characteristics of the glass structure; and a first interface configured to couple with a control unit, and the control unit being configured to receive an adjusting signal from the interaction unit and to control the modulating unit to modulate the optical characteristics of a target region of the glass structure in response to the adjusting signal; wherein the interaction unit and the modulating unit are isolated from each other by a filling material arranged therebetween, a transmittance of the filling material is equal to or greater than about 50%, the relative permittivity of the filling material being equal to or less than about 10, and the thickness of the filling material being equal to or greater than about 50 μm.

According to an embodiment of the disclosure, the glass structure further comprises: a second interface configured to couple with a detecting unit, and the detecting unit being configured to detect environmental parameters and to provide a detection signal, which indicates the environmental parameters, to the control unit, wherein the control unit is further configured to determine whether a first condition, which is adapted to indicate that the interaction unit is disabled, is satisfied, if the result of the determining step for the first condition is negative, the control unit controls the modulating unit to modulate the optical characteristics of the target region of the glass structure in response to the adjusting signal; and if the result of the determining step for the first condition is affirmative, the control unit controls the modulating unit to modulate the optical characteristics of the target region of the glass structure in response to the detection signal.

According to an embodiment of the disclosure, in the case that the control unit determines that the first condition is satisfied, the control unit is further configured to determine whether a second condition, which is adapted to indicate that the interaction unit is enabled, is satisfied, if the result of the determining step for the second condition is negative, the control unit controls the modulating unit to modulate the optical characteristics of the target region of the glass structure in response to the detection signal, and if the result of the determining step for the second condition is affirmative, the control unit controls the modulating unit to modulate the optical characteristics of the target region of the glass structure in response to the adjusting signal.

Still another aspect of the disclosure relates to a vehicle window, wherein the vehicle window comprises the glass structure as descried above.

Still another aspect of the disclosure relates to a method for adjusting optical characteristics of a glass structure, the glass structure comprising a glass body, a modulating unit and an interaction unit, the method comprising: receiving an adjusting signal which indicates an execution of adjusting the optical characteristics of the glass structure, from the modulating unit; and controlling the modulating unit to modulate the optical characteristics of a target region of the glass structure in response to the adjusting signal.

According to an embodiment of the disclosure, the glass structure further comprises a detecting unit, and the method further comprises: determining whether a first condition, which is adapted to indicate that the interaction unit is disabled, is satisfied, if the result of the determining step for the first condition is negative, controlling the modulating unit to modulate the optical characteristics of the target region of the glass structure in response to the adjusting signal; and if the result of the determining step for the first condition is affirmative, controlling the modulating unit to modulate the optical characteristics of the target region of the glass structure in response to the detection signal.

According to an embodiment of the disclosure the method further comprises: in the case that the control unit determines the first condition is satisfied, determining whether a second condition, which is adapted to indicate that the interaction unit is enabled, is satisfied, if the result of the determining step for the second condition is negative, controlling the modulating unit to modulate the optical characteristics of the target region of the glass structure in response to the detection signal, and if the result of the determining step for the second condition is affirmative, controlling the modulating unit to modulate the optical characteristics of the target region of the glass structure in response to the adjusting signal.

Still another aspect of the disclosure relates to a computing apparatus comprising a memory, a processor and instructions stored in the memory and executed by the processor, wherein the processor executes the instructions to realize the method as described above.

Still another aspect of the disclosure relates to a machine readable storage medium on which executable instructions are stored, wherein the executable instructions, when executed, cause the machine to perform the steps of the method as described above.

Thus, according to the glass structure and the vehicle window of the disclosure, a dimming process can be executed without additional shielding components, thereby reducing the weight of the glass structure and thus the vehicle window, and releasing the space previously occupied by the shielding components. Furthermore, according to the disclosure, the dimming process is more intelligent and flexible, and user friendliness is enhanced.

BRIEF DESCRIPTION OF THE DRAWINGS

To provide a more complete understanding of the disclosure and features and advantages thereof, reference is made to the following description, taken in conjunction with the accompanying figures, in which.

DESCRIPTION OF EMBODIMENTS

The subject matters described herein will be discussed with reference to the exemplary embodiments. It should be understood that the discussion of these embodiments is intended only to enable those skilled in the art to better understand the subject matters described herein, rather than to limit the protection scope of the claims, applicability or examples. The functions and arrangements of the elements discussed in the disclosure may be changed without departing from the protection scope of the disclosure. Each example can omit, replace or add various processes or components as needed. For example, the described method can be implemented in a different order from that described, and the steps can be added, omitted or combined. In addition, features described in some examples can be combined in other examples.

In the disclosure, the term "comprising" and its variants are open-ended terms, meaning "comprising but not limited to". The term "based" means "at least partially based". The terms "one embodiment" and "an embodiment" mean "at least one embodiment". The term "another embodiment" means "at least one other embodiment". The terms "first", "second" and the like may refer to different or identical objects. Other definitions, whether explicit or implicit, may be included below. Unless explicitly specified in the context, the definition of a term is consistent throughout the specification.

The terms "about" and "approximately" when used in conjunction with a numerical variable, generally mean that the value of the variable and all values of the variable are within experimental error (for example, within a mean value and 95% confidence interval) or within ±10% of the specified value or a wider range.

Figure 1:
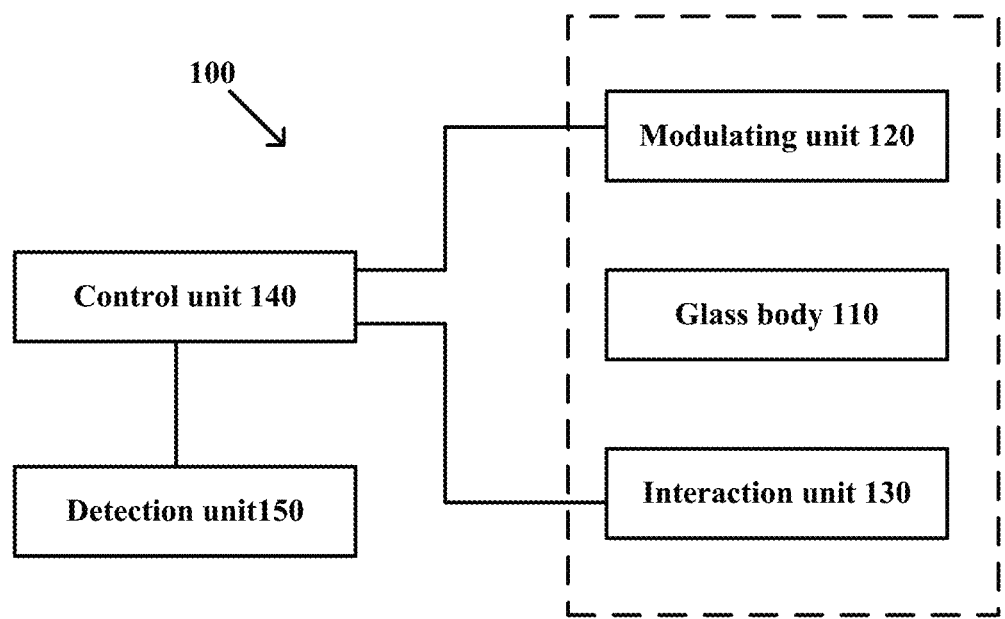
FIG. 1 shows a schematic block diagram of a glass structure in accordance with an exemplary embodiment of the disclosure.

FIG. 1 schematically shows a glass structure 100 in accordance with a feasible embodiment of the disclosure, which is widely applicable, for example, the glass structure 100 can be used in vehicles, trains, ships, aircrafts and building constructions, etc.

As shown in FIG. 1, the glass structure 100 includes a glass body 110, a modulating unit 120 coupled to the glass body 110, and an interaction unit 130. The modulating unit 120 adjusts one or more optical characteristics of the glass structure 100, such as, but not limited to, haze, light transmittance and tint. The interaction unit 130 provides an adjusting signal indicating the adjustment of the optical characteristics of the glass structure 100. The glass structure 100 also includes a control unit 140 coupled to the modulating unit 120 and the interaction unit 130. The control unit 140 receives the adjusting signal from the interaction unit 130 and controls the modulating unit 120 to adjust the optical characteristics of a target area of the glass structure 100 according to the adjusting signal.

In the disclosure, the target area of the glass structure 100 refers to the area, which is to be dimmed, of the glass structure 100. According to an embodiment of the disclosure, the area to be dimmed may include the entire area of the glass structure 100, or may include only a partial area of the glass structure 100.

According to the disclosure, there is a filling material (not shown) between the interaction unit 130 and the modulating unit 120.

In one aspect, the glass structure 100 should have good light transmission performance such as transparency and light transmission. Thus, the filler material of the glass structure 100 should have good light transmission performance.

In another aspect, the filler material of the glass structure 100 should have the function of isolating the electric fields between the interaction unit 130 and the modulating unit 120 so as to reduce or eliminate the interaction (e.g., interference) between the electric field of the interaction unit 130 and the electric field of the modulating unit 120.

In still another aspect, relative dielectric constant of the filler material of the glass structure 100 is usually taken into account when it comes to thickness setting of the filler material to ensure that the filler material has good insulation performance.

There are no special limitations on the choice of the filling materials in the disclosure, as long as they can meet the above requirements.

Transparency performance can be characterized by, for example, transmittance. The measuring device for measuring the transmittance may be, for example, a transmittance meter or a transmittance haze meter. The light transmittance of the filling material in the disclosure is greater than or equal to about 50%, for example, but is not limited to being greater than or equal to about 60%, greater than or equal to about 70% or greater than or equal to about 80%. Preferably, the light transmittance of the filling material in the disclosure is greater than or equal to about 85%, and further preferably greater than or equal to about 90% or higher. Considering the influence of light reflection, absorption and scattering, the transmittance of filler materials is usually no more than 98%, for example, no more than 95%.

The relative dielectric constant of the filling material in the disclosure is less than or equal to about 10, for example, less than or equal to about 8, less than or equal to about 6;

preferably less than or equal to about 4, and further preferably about 3. Considering the real application of the materials, the relative dielectric constant is usually greater than or equal to about 0.5, greater than or equal to about 1.0. In one embodiment, the relative dielectric constant of the filling material is about 3.1-6.2. The relative dielectric constant of the filling material in the disclosure can be measured, for example, by a dielectric constant measuring device. The relative dielectric constant is the ratio of the reduction of electric field in the medium to the original applied electric field (in vacuum), which can characterize the dielectric properties or polarization properties of the material. The relative dielectric constant can be measured, for example, using a concentrated circuit method, a transmission line method, a resonance method, or the like, see, for example, QJ1990.3-90, SJ/T1147-93.

The thickness of the filling material in the disclosure is greater than or equal to about 50 μm, for example, greater than or equal to about 60 μm, greater than or equal to about 70 μm, greater than or equal to about 80 μm, greater than or equal to about 90 μm, greater than or equal to about 100 μm, greater than or equal to about 200 μm. In addition, when setting the thickness of filling material of glass structure 100 according to the disclosure, the thickness and weight of glass structure 100 need to be considered, and the filling material of glass structure 100 should have good transmittance as well. In some embodiments, the thickness of the filling material is not more than 1 mm. For example, about 0.4 mm, about 0.5 mm, about 0.8 mm or about 1 mm. In other embodiments, the thickness of the filling material is about 50 μm-1 mm.

Exemplary filling materials may be implemented as polyvinyl butyral (PVB), ethylene-vinyl acetate (EVA) or combinations thereof.

It should be understood that, according to an embodiment of the disclosure, the control unit 140 may be integrated with the interaction unit 130 in the glass body 110, or may form an integrated component together with the interaction unit 130, or may also form an integrated component together with the glass body 110. The control unit 140 may also work as a separate component and be external to both the glass body 110 and the interaction unit 130.

Figure 2:
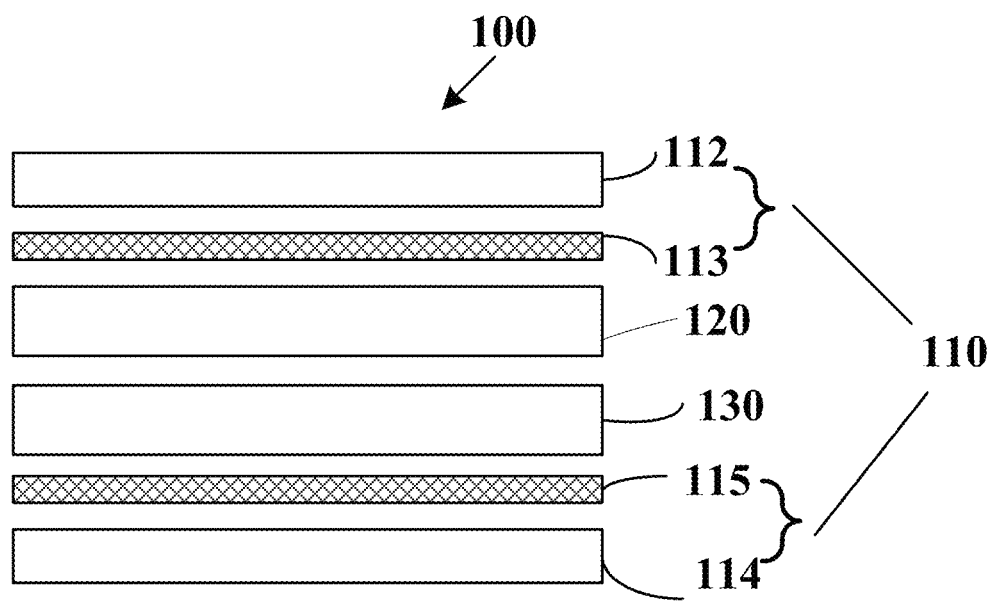
FIG. 2 shows a schematic cross-sectional view of the glass structure shown in FIG. 1.

FIG. 2 schematically shows a cross-section view of the glass structure 100 according to a feasible embodiment of the disclosure. As shown in FIG. 2, the glass body 110 includes a first glass substrate 112 and a second glass substrate 114. The first glass substrate 112 and the second glass substrate 114 may be various types of glass, such as single-layer glass. The shapes of the first glass substrate 112 and the second glass substrate 114 can be flat or curved with certain curvature. The first glass substrate 112 and the second glass substrate 114 have certain transparency. In some embodiments, the modulating unit 120 and the interaction unit 130 are arranged between the first glass substrate 112 and the second glass substrate 114.

Continuing with FIG. 2, in order to ensure good adhesion between the layers of the glass structure 100, the glass structure 100 also includes a first adhesive layer 113 between the first glass substrate 112 and the modulating unit 120, and a second adhesive layer 115 between the second glass substrate 114 and the interaction unit 130. The first adhesive layer 113 and the second adhesive layer 115 may include, for example, polyvinyl butyral (PVB) or vinyl ethylene acetate (EVA). In some embodiments, the entire or part of the first adhesive layer 113 may be tinted. The entire or part of the second adhesive layer 115 may also be tinted.

The interaction unit 130 may interact with the user (not shown) to provide an adjusting signal indicating an adjustment of the optical characteristics of the glass structure 100 based on a dimming instruction from the user. In the disclosure, the interaction unit 130 has a variety of implementations, such as, but not limited to, a touch device, a light sensor, a gesture sensor, an audio sensor, an operation button, and an operation handle. It should be understood that the interaction unit 130 can also include other suitable implementations according to the specific application of the glass structure 100. In the following, an example of the interaction unit 130 being implemented as a touch control device is described.

In some embodiments, the interaction unit 130 may be implemented as a touch device. The Touch device can employ various touch technologies, such as, but not limited to, capacitive touch, resistive touch, surface acoustic wave touch, or infrared touch.

The touch device receives touch gestures and provides dimming signals according to touch gestures. For example, the touch device receives a sliding gesture in a horizontal direction, in which a left sliding gesture indicates an increase in the haze value of the glass structure 100, and a right sliding gesture indicates a decrease in the haze value of the glass structure 100. For example, the touch device can also receive a sliding gesture in a vertical direction, in which an upward sliding gesture indicates an increase in the haze value of the glass structure 100, and a downward sliding gesture indicates a decrease in the haze value of the glass structure 100.

In some embodiments, the touch device may receive multiple touch gestures, each of which corresponds to a predetermined level of haze or light transmittance. For example, a double-click touch gesture corresponds to a haze value of 100%. That is to say, a double-click touch device makes the glass structure 100 opaque. For example, the haze value of glass structure 100 can be changed step by step by touch gestures of multiple clicks, wherein each click increases the haze value by 50%, so that the haze value can be switched cyclically between 0%, 50% and 100%. That is to say, the glass structure 100 is switched cyclically between transparent state, translucent state and opaque state.

It should be understood that touch gestures have flexible and various forms, and that touch gestures can correspond to dimming instructions in a variety of appropriate ways, not limited to this.

In some embodiments, the touch device is located in the glass structure 100 and is closer to user side than the modulating unit 120, so as to facilitate the user to touch. For example, when the glass structure 100 is used in a vehicle window, the touch device is located more inside the vehicle than the modulating unit 120, so that the touch device can be easily touched.

In some embodiments, the position of the touch device in the glass structure 100 may be indicated by a pattern, for example, a pattern of a particular shape such as a circle or two points. The position of the touch device in the glass structure 100 can also be fixed, for example, at the corner or the lower border, without the need for pattern indication.

Figure 3:
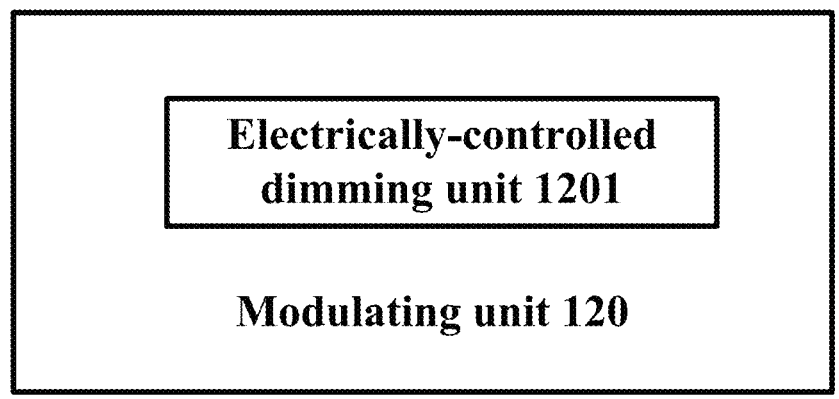
FIG. 3 shows an illustrative embodiment of a modulating unit of the glass structure shown in FIG. 1.

FIG. 3 schematically shows the modulating unit 120 according to one feasible embodiment of the disclosure. As shown in FIG. 3, the modulating unit 120 includes an electrically-controlled dimming unit 1201. The control unit 140 generates an electrical signal applied to the electronically-controlled dimming unit 1201 according to the adjusting signal. The purpose of dimming is achieved by means of changing the electrical signal applied to the electronically-controlled dimming unit 1201, which realizes the adjustment of the optical characteristics of the target area of the glass structure 100.

In some embodiments, the optical characteristics of the target area of the glass structure 100 are continuously changed. For example, it is achieved by means of applying continuously varying electrical signals (e.g., electrical signals with continuously varying voltage amplitudes) to the electronically-controlled dimming unit 1201. In some embodiments, the optical characteristics of the target area of the glass structure 100 are changed step by step. For example, it may be achieved by applying an electrical signal varied step-by-step (e.g., the voltage amplitude of the electrical signal is varied step-by-step) to the electronically-controlled dimming unit 1201. In some embodiments, the optical characteristics of the target area of the glass structure 100 may be adjusted to a predetermined level. For example, it may be achieved by applying an electric signal with a predetermined value (e.g., an electric signal with a predetermined value corresponding to the predetermined level) to the electronically-controlled dimming unit 1201.

It should be understood that other implementations can also be used to adjust the optical characteristics of the target area of the glass structure 100, as long as the implementation is applicable to the electronically-controlled dimming unit 1201.

Electronically-controlled dimming unit 1201 may be implemented as one or more types of photoelectric glasses, such as, but not limited to, polymer dispersed liquid crystal (PDLC) unit, suspended particle device (SPD) unit, and electrochromic (EC) unit. By means of using a variety of photoelectric glasses, the optical characteristics of the glass structure 100 can be adjusted in different aspects. The photoelectric glasses are mostly sandwiched.

Figure 4:
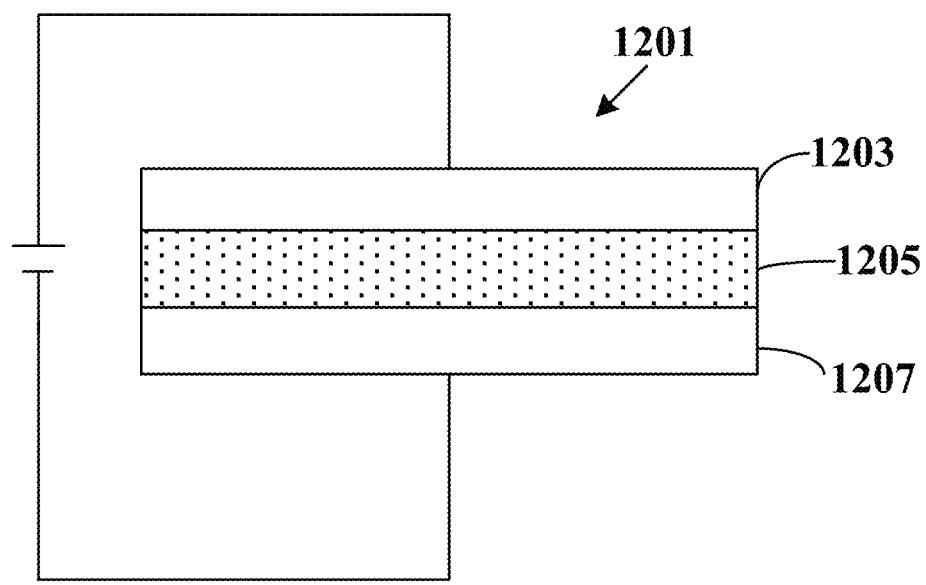
FIG. 4 shows a schematic cross-sectional view of a multi-layer structure of an electrically-controlled dimming unit according to an exemplary embodiment of the disclosure.

FIG. 4 schematically shows an electronically-controlled dimming unit 1201 according to a feasible embodiment of the disclosure, which has a first electrode layer 1203 and a second electrode layer 1207 as control electrodes. The electronically-controlled dimming unit 1201 has an electronically-controlled dimming layer 1205 located between the first electrode layer 1203 and the second electrode layer 1207. These layers form an integrated structure, for example, by autoclave in high temperature and high pressure. For example, there are adhesive layers between the first electrode layer 1203 and the electronically-controlled dimming layer 1205, and between the second electrode layer 1207 and the electronically-controlled dimming layer 1205 (not shown). The adhesive layer is composed of, for example, polyvinyl butyral (PVB) or vinyl acetate (EVA). In some embodiments, voltage is applied to the first electrode layer 1203 and the second electrode layer 1207 to form an electric field in the electrically-controlled dimming layer 1205. Changing the voltage between the two electrode layers can change the electric field in the electronically-controlled dimming layer 1205, thus realizing the purpose of dimming.

According to the embodiment of the disclosure, the edges of the electronically-controlled dimming unit 1201 are sealed by an isolating material (not shown), such that the electronically-controlled dimming unit 1201 is not affected by the components (e.g., adhesive layers) which are contacted with the electronically-controlled dimming unit 1201. For example, the edges of the electronically-controlled dimming unit 1201 are encapsulated by the isolating material. In some embodiments, isolation materials are selected from one or more of polyolefins, polyesters, polyvinyl chloride, fluoropolymer and thermosetting resins, such as, but not limited to, polyethylene terephthalate, polyvinyl chloride, polyethylene, polytetrafluoroethylene, etc. In a preferred embodiment, the isolating material is selected from one or more of polyethylene terephthalate, polyvinyl chloride, polyethylene and polytetrafluoroethylene.

Figure 5:
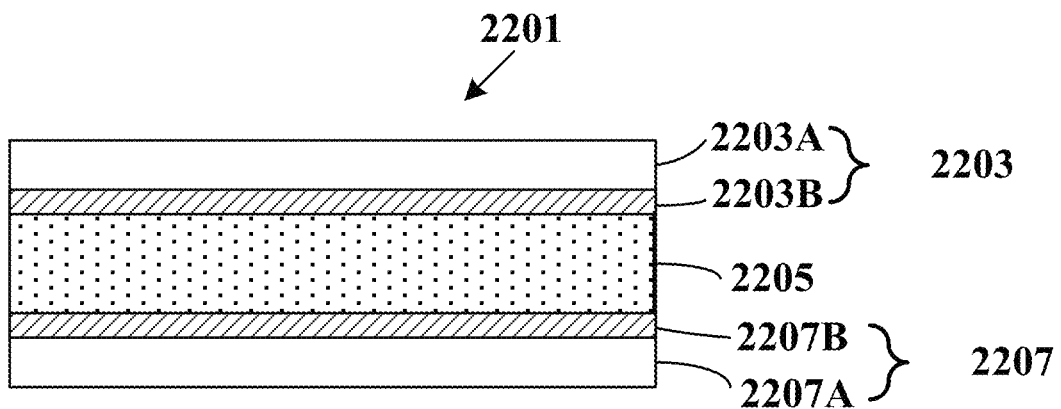
FIG. 5 shows a schematic cross-sectional view of a multi-layer structure of an electrically-controlled dimming unit according to another exemplary embodiment of the disclosure.

FIG. 5 schematically shows an electronically-controlled dimming unit 2201 according to a feasible embodiment of the disclosure. Referring to FIG. 5, the electronically-controlled dimming unit 2201 is implemented by, for example, polymer dispersed liquid crystal (PDLC) technology. In this embodiment, the electronically-controlled dimming layer 1205 is realized by the polymer dispersed liquid crystal layer 2205. The first electrode layer 1203 is realized by the first transparent conductive film 2203 attached to one side of the polymer dispersed liquid crystal layer 2205, and the second electrode layer 1207 is realized by the second transparent conductive film 2207 attached to the other side of the polymer dispersed liquid crystal layer 2205. That is to say, the first transparent conductive film 2203 and the second transparent conductive film 2207 are used as control electrodes to drive the polymer dispersed liquid crystal layer 2205.

In some embodiments, the first transparent conductive film 2203 includes a first substrate 2203A and a first transparent conductive layer 2203B overlaid on the surface, which is facing the side of the polymer dispersed liquid crystal layer 2205, of the first substrate 2203A. The first transparent conductive layer 2203B is adjacent to the polymer dispersed liquid crystal layer 2205. The second transparent conductive film 2207 includes a second substrate 2207A and a second transparent conductive layer 2207B overlaid on the surface, which is facing the side of the polymer dispersed liquid crystal layer 2205, of the second substrate 2207A. The second transparent conductive layer 2207B is adjacent to the polymer dispersed liquid crystal layer 2205. In some embodiments, the first substrate 2203A and the second substrate 2207A may be transparent plastic substrates or flexible polyester films, including, for example, but not limited to, PET substrates. The first transparent conductive layer 2203B and the second transparent conductive layer 2207B are indium tin oxide layers formed on the first substrate 2203A and the second substrate 2207A respectively.

It should be understood that the specific materials of the first transparent conductive layer 2203B and the second transparent conductive layer 2207B are not limited to this. In other embodiments, the first transparent conductive layer 2203B and the second transparent conductive layer 2207B may also be implemented by other transparent conductive materials. Connectors electrically connected to outside may be provided on the first transparent conductive layer 2203B and the second transparent conductive layer 2207B to apply voltage to the first transparent conductive layer 2203B and the second transparent conductive layer 2207B.

Polymer dispersed liquid crystal layer 2205 includes polymer layer and liquid crystal droplets dispersed in polymer layer. The polymer layer includes a polymer material. For example, the polymer layer includes materials whose refractive index matches the refractive index of the liquid crystal droplets. In the absence of an applied electric field, the liquid crystal droplets are dispersed in the polymer dispersed liquid crystal layer 2205 in a disorderly arrangement, and thus the polymer dispersed liquid crystal layer 2205 is opaque or translucent. In this case, the polymer dispersed liquid crystal layer 2205 has a high haze value. When voltage is applied on both sides of the polymer dispersed liquid crystal layer 2205 to form an electric field, the liquid crystal droplets are orderly dispersed in the polymer layer, and thus the polymer dispersed liquid crystal layer 2205 is transparent. In this case, the polymer dispersed liquid crystal layer 2205 has a small haze value.

Figure 6:
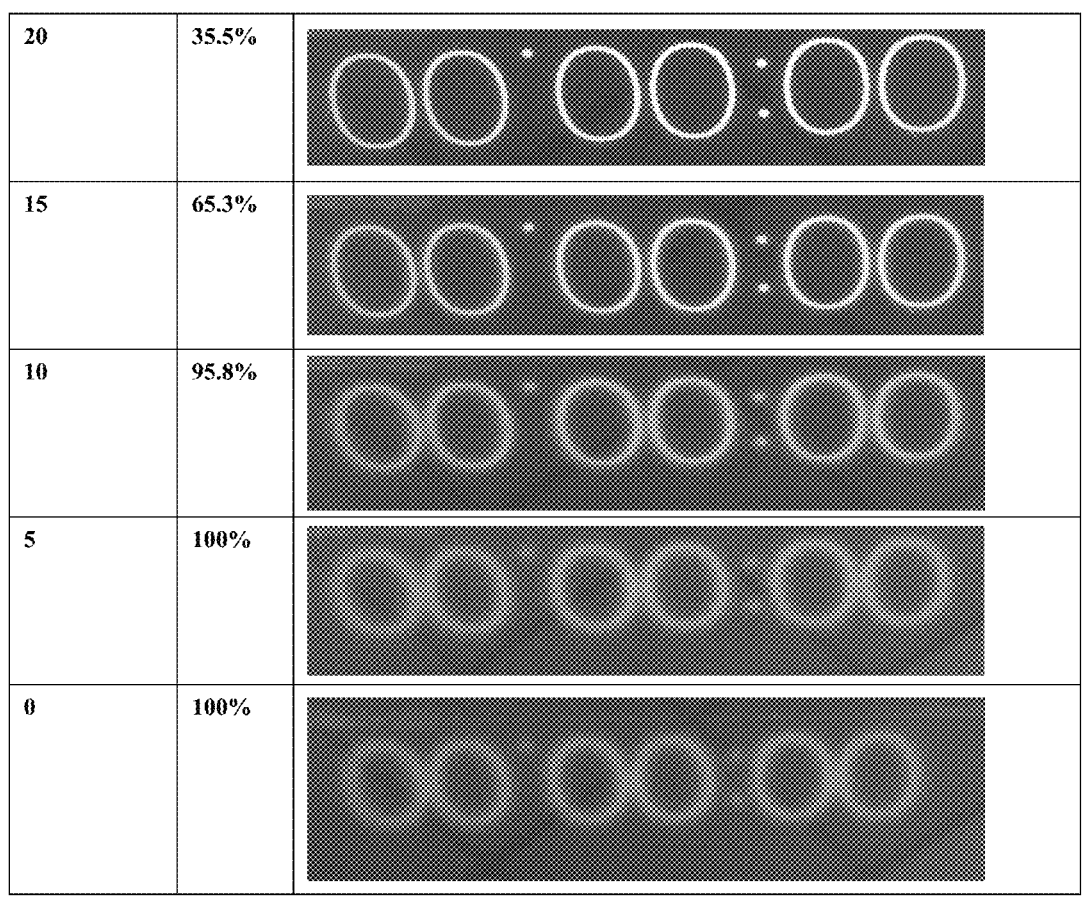
FIG. 6 shows an illustration of haze change in accordance with an exemplary embodiment of the disclosure, in which the relationship between haze value, voltage applied to the electronically-controlled dimming unit, and visual effects is shown.

In the disclosure, the "haze" refers to the ability of light to scatter. Specifically, the haze value is a ratio of the scattered light flux, which is transmitted through the sample and deviated from the incident direction, to the transmitted light flux, and the haze value is expressed by a percentage. For example, the greater the haze value, the stronger the material's ability to scatter light, and the less visible the human eye is. FIG. 6 is a graphical representation of haze changes in accordance with an embodiment of the disclosure, which shows the relationship between haze values, voltages applied to the control electrode and visual effects. It should be understood that the various values in FIG. 6 are exemplary and that the haze value and the applied control parameters may vary depending on particular situations. It should be understood that the visual effect in FIG. 6 is only an example, and the actual visual effect is also related to factors such as the distance between the observed object and the glass structure.

It should be understood that the application of an electronically-controlled dimming glass which is in a forward dimming mode, is described herein, for example, the polymer dispersed liquid crystal (PDLC) glass which is in a forward dimming mode. The disclosure may also use a dimming glass which is in a reversed dimming mode, such as a polymer dispersed liquid crystal (PDLC) glass in a reversed dimming mode. That is to say, it is in a transparent state when the power is turned off, and becomes a mist state after being energized. Thereby, it is possible to protect the privacy of the user and to save energy and protect environment. The disclosure may also use a bistable dimming glass, wherein the liquid crystal molecules can realize the conversion between the vertical alignment arrangement and the random focalconic arrangement, thereby giving different transmittances to achieve different dimming effects. Thereby, the possibility of multi-application is further improved.

In some embodiments, the electrically-controlled dimming unit 2201 is implemented by means of using a suspended particle device (SPD) technique or an electrochromic (EC) technology. For example, the light transmittance is changed by changing the magnitude of the voltage applied to the electronically-controlled dimming unit 2201.

According to the embodiment of the disclosure, the colouration technique may also be applied to the electronically-controlled dimming unit 2201, thereby achieving adjustment to a tinted state or to a transparent state. That is to say, the tinted state of the glass structure 100 may be achieved by means of using the colouration technique.

For example, in general, the polymer dispersed liquid crystal layer 2205 appears white when no voltage is applied. In some embodiments, a dichroic dye may be added to the polymer dispersed liquid crystal layer 2205 to enable the polymer dispersed liquid crystal layer 2205 to be tinted or black when no voltage is applied. Depending on the type of the added dichroic dye, the polymer dispersed liquid crystal layer 2205 can appear a variety of different colors, such as green, red, etc., when no voltage is applied. When a voltage is applied to the first transparent conductive film 2203 and the second transparent conductive film 2207, the saturation of the color or black of the polymer dispersed liquid crystal layer 2205 is lowered. With the increase of applied voltage between the first transparent conductive film 2203 and the second transparent conductive film 2207, the polymer dispersed liquid crystal layer 2205 gradually approaches to colorless, that is, appears transparent.

Referring back to FIG. 1, the glass structure 100 also includes a detecting unit 150 coupled to the control unit 140. The detecting unit 150 detects environmental parameters around the glass structure 100, such as temperature and light intensity around the glass structure 100, and provides a detection signal representing the environmental parameters to the control unit 140. The detecting unit may include a variety of implementations, such as, but not limited to, optical sensors, temperature sensors, etc. According to the embodiment of the disclosure, the detecting unit 150 and the control unit 140 execute the control of light adjustment together. Hereinafter, a process in which the detecting unit 150 and the control unit 140 together adjust the optical characteristics of the glass structure 100 will be specifically described.

According to the disclosure, the glass structure 100 has a manual adjustment mode and an automatic adjustment mode. In the case that the control unit 140 controls the modulating unit 120 to adjust light in response to the adjusting signal from the interaction unit 130, the glass structure 100 is in the manual adjustment mode. In the case that the control unit 140 controls the modulating unit 120 to adjust light in response to the detection signal from the detecting unit 150, the glass structure 100 is the an automatic adjustment mode.

The detecting unit 150 detects the environmental parameters around the glass structure 100, and provides the detection signal representing the environmental parameters to the control unit 140. Based on the received detection signal, the control unit 140 determines whether a first condition which is used for disabling interaction unit 130 is satisfied. If the control unit 140 determines that the first condition is not satisfied, the control unit 120 adjusts the optical characteristics of the target area of the glass structure 100 in response to the adjusting signal. In other words, if the first condition is not satisfied, the glass structure 100 is in the manual adjustment mode. If the control unit 140 determines that the first condition is satisfied, the control unit 120 adjusts the optical characteristics of the target area of the glass structure 100 in response to the detection signal. That is to say, if the first condition is satisfied, the glass structure 100 is in the automatic adjustment mode.

In a first embodiment, if the following first situation occurs, the control unit 140 determines that the first condition is satisfied: the control unit 140 receives a first trigger signal indicating that the interaction unit 130 is disabled from the interaction unit 130. For example, when the interaction unit 130 is implemented as a touch device, the touch device receives a touch gesture for disabling the manual adjustment mode (i.e., for entering the automatic adjustment mode), and based on this touch gesture, provides the control unit 140 with a first trigger signal for disabling the interaction unit 110.

In a second embodiment, if the following second situation occurs, the control unit 140 determines that the first condition is satisfied: the control unit 140 receives the detection signal, of which the intensity reaches a predetermined value, from the detecting unit 150. For example, when the detecting unit 150 is implemented as a light sensor, the light sensor senses the light, of which the intensity reaches a predetermined level, or the light from a predetermined direction (e.g., a dazzling light from the front) and generates a detection signal with the intensity of a predetermined level based on the detection result, wherein the predetermined level of the intensity of the detection signal corresponds to the predetermined level of the intensity of the sensed light or corresponds to the predetermined direction of the sensed light. Then, the detecting unit 150 supplies the generated detection signal to the control unit 140.

In a third embodiment, if the following third situation occurs, the control unit 140 determines that the first condition is satisfied: the control unit 140 does not receive the adjusting signal from the modulating unit 120 for a predetermined period of time.

It should be understood that the situations where the control unit 140 determines that the first condition is satisfied are not limited to the above three situations, and may also include other suitable situations.

If the first condition is satisfied and the glass structure 100 is in the automatic adjustment mode, the control unit 140 determines whether the second condition for enabling the interaction unit 130 is satisfied based on the detection signal. If the control unit 140 determines that the second condition is not satisfied, the control unit 140 controls the modulating unit 120 to adjust the optical characteristics of the target area of the glass structure 100 in response to the detection signal. That is to say, if the second condition is not met, the glass structure 100 continues to be in the automatic adjustment mode. If the control unit 140 determines that the second condition is satisfied, the control unit 140 controls the modulating unit 120 to adjust the optical characteristics of the target area of the glass structure 100 in response to the adjusting signal. That is to say, if the second condition is satisfied, the glass structure 100 enters into the manual adjustment mode.

In some embodiments, the control unit 140 determines that the second condition is satisfied if the following situations occur: the control unit 140 receives a second trigger signal from the interaction unit 130 for indicating the enablement of the interaction unit 130. For example, when the interaction unit 130 is implemented as a touch device, the touch device receives a touch gesture for disabling the automatic adjustment mode (i.e., entering into the manual adjustment mode), and provides the second trigger signal to the control unit 140 based on the touch gesture for disabling the interaction unit 130.

It should be understood that the second condition may also include other aspects, and is not limited thereto.

Figure 7:
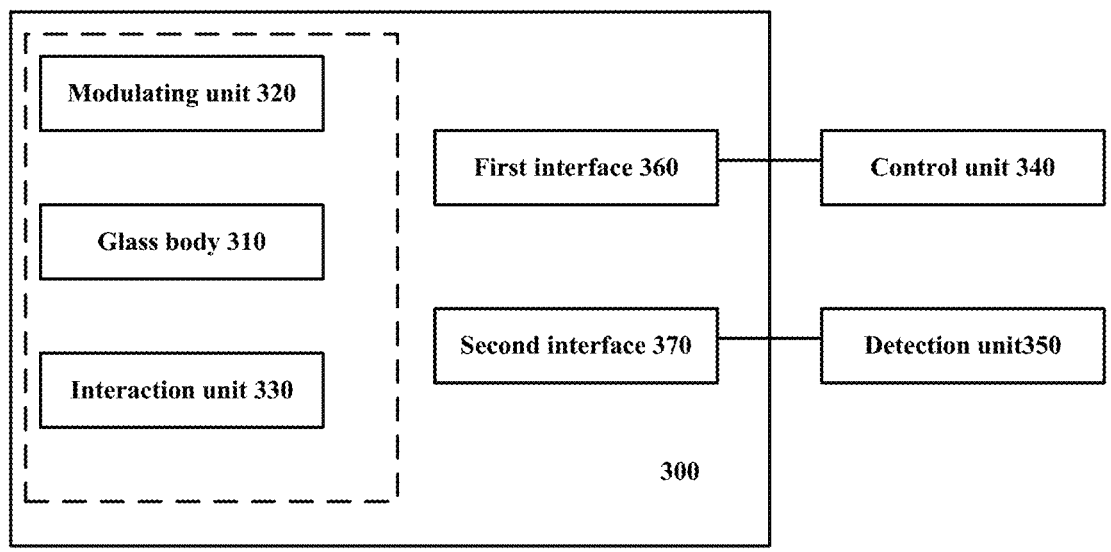
FIG. 7 shows a schematic block diagram of a glass structure according to another exemplary embodiment of the disclosure.

FIG. 7 schematically shows a glass structure 300 according to another exemplary embodiment of the disclosure. Compared with the glass structure 100 illustrated in FIG. 1, the glass structure 300 illustrated in FIG. 7 does not include a control unit 340 and a detecting unit 350, but includes a first interface 360 coupled with the control unit 340 and a second interface 370 coupled with the detecting unit 350. According to the glass structure 300, the glass body 310, the modulating unit 320 and the interaction unit 330 can all be implemented in the same way as that of the glass structure 100 and achieve the same functions. Therefore, the above description about the glass body 110, the modulating unit 120 and the interaction unit 130 is also applicable here. Moreover, the implementation and function of the control unit 340 are the same as that of the control unit 140 of the glass structure 100, and the implementation and function of the detecting unit 350 are the same as that of the detecting unit 150 of the glass structure 100. Therefore, the above description about the control unit 140 and the detecting unit 150 is also applicable here. According to the glass structure 300 of the disclosure, there is a filling material between the modulating unit 320 and the interaction unit 330, such as the filling material described above. Therefore, the above description about the filling materials is also applicable here.

According to the glass structure 300, the first interface 360 is connected to the control unit 340, and the second interface 370 is connected to the detecting unit 350. In some embodiments, one end of the first interface 360 is connected to the control unit 340, and the other end of the first interface 360 is connected to the modulating unit 320 and the interaction unit 330. That is to say, the modulating unit 320 and the interaction unit 330 are both connected to the control unit 340 through the first interface 360. In some embodiments, the modulating unit 320 and the interaction unit 330 may each have a connector which is coupled to the first interface 360 respectively. In some embodiments, one end of the second interface 370 is coupled to the detecting unit 350, and the other end of the second interface 370 is coupled to the first interface 360. That is to say, the second interface 370 may be connected between the detecting unit and the first interface 360. For example, the detection signal is supplied to the control unit 340 via the second interface and the first interface sequentially.

It should be understood that the first interface 360 and the second interface 370 may be implemented with other connection configurations, and are not limited thereto.

Figure 8:
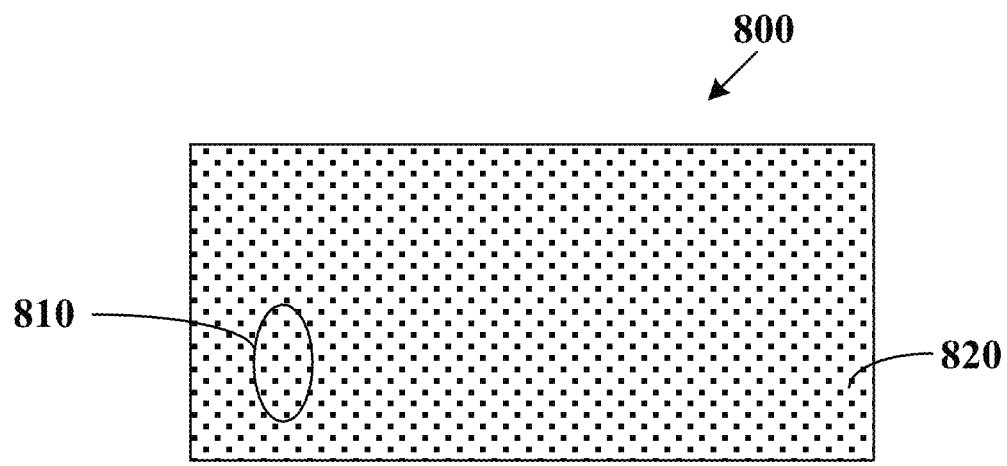
FIG. 8 shows a schematic diagram of a vehicle window in accordance with an exemplary embodiment of the disclosure.

FIG. 8 schematically shows a vehicle window 800 in accordance with one possible embodiment of the disclosure. The vehicle window 800 can be various windows in a vehicle, including but not limited to, front windshield, rear windshield, front door glazing, rear door glazing, sunroof, quarter window, and the like. The vehicle window 800 may include the glass structure 100 as illustrated in FIG. 1 or the glass structure 300 as illustrated in FIG. 7. The vehicle window 800 has a touch area 810 and a shadow area 820. The location of the touch area 810 on the vehicle window 800 can be graphically shown. A touch film is provided at the touch area 810, and implemented with the touch mode of the touch device of the interaction unit 130 as described above. A dimming film is provided at the shielding area 820, and, for example, implemented with the electronically-controlled dimming unit as above-described. Both the touch film and the dimming film are connected to a controller (for example, implemented with the control unit as described above). The controller receives a touch signal from the touch film, and converts the touch signal into a corresponding adjusting signal for dimming, which is provided to the dimming film, thus realizing the dimming function of the vehicle window 800. Accordingly, the above description about the modulating units 120, 320, the interaction units 130, 330 and the control units 140, 340 is also applicable here. According to the vehicle window 800 of the disclosure, a filling material is provided between the dimming film and the touch film. For example, the filling material of the vehicle window 800 is implemented with the filling material as described above. Therefore, the above description about the filling materials is also applicable here.

In some embodiments, the position of the touch area 810 in the vehicle window 800 may be indicated by a pattern, for example, a pattern of a specific shape such as a circle or two points. The location of the touch area 810 in the vehicle window 800 may also be a fixed location on the vehicle window 800, such as a corner or a lower border, without the need for a pattern indication.

In some embodiments, the touch film is located in the vehicle window 800 and is closer to the user side than the dimming film to facilitate user touch. That is to say, the touch film is located on the inner side of the vehicle window 800 with respect to the dimming film so as to be touched.

Figure 9:
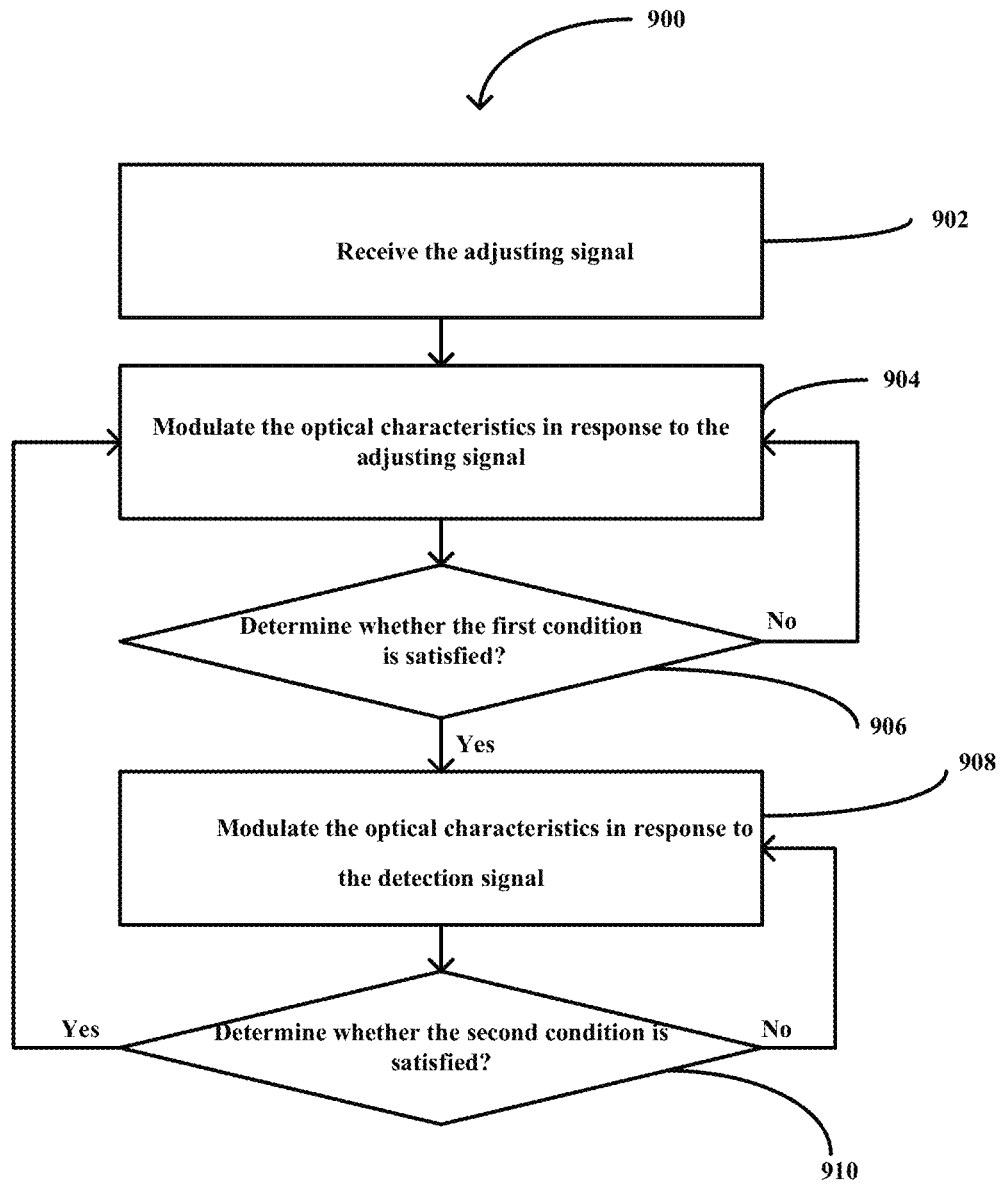
FIG. 9 shows a flowchart of a method implemented by the control unit illustrated in FIGS. 1 and 7 in accordance with an embodiment of the disclosure.

FIG. 9 illustrates a method 900 implemented by the control unit illustrated in FIGS. 1 and 7 in accordance with an embodiment of the disclosure. Method 900 can be performed at the control unit 140 in FIG. 1 and the control unit 340 in FIG. 7.

In the method 900 illustrated in FIG. 9, the control unit 140, 340 receives an adjusting signal from the interaction unit 130, 330 for indicating an adjustment of the optical characteristics of the glass structures 100, 300 (block 902). Next, the control unit 140, 340 controls the modulating unit 120, 320 to adjust the optical characteristics of the target area of the glass structure 100, 300 in response to the adjusting signal (block 904).

The control unit 140, 340 receives the detection signal from the detecting unit 150, 350 and determines whether the first condition for disabling the interaction unit 130, 330 is satisfied based on the detection signal (block 906). If the control unit 140, 340 determines that the first condition is not satisfied, the control unit 140, 340 controls the control modulating unit 120, 320 to adjust the optical characteristics of the target area of the glass structure 100, 300 in response to the adjusting signal. That is to say, in the condition that the first condition is not met, the glass structure 100, 300 is in a manual adjustment mode. If the control units 140, 340 determine that the first condition is satisfied, the control units 140, 340 controls the control modulating unit 120, 320 to adjust the optical characteristics of the target area of the glass structure 100, 300 in response to the detection signal (block 908). That is to say, in the case that the first condition is satisfied, the glass structure 100, 300 is in the automatic adjustment mode.

In the case that the first condition is satisfied, i.e., the glass structure 100, 300 is in the automatic adjustment mode, the control unit 140, 340 determines whether the second condition for enabling the interaction units 130 and 330 is satisfied based on the detection signal (block 910). If the control unit 140, 340 determines that the second condition is not satisfied, the control unit 140, 340 controls the control modulating unit 120, 320 to adjust the optical characteristics of the target area of the glass structure 100, 300 in response to the detection signal. That is to say, if the second condition is not met, the glass structure 100, 300 continues to be in the automatic adjustment mode. If the control unit 140, 340 determines that the second condition is satisfied, the control unit 140, 340 controls the control modulating unit 120, 320 to adjust the optical characteristics of the target area of the glass structure 100, 300 in response to the adjusting signal. That is to say, if the second condition is satisfied, the glass structure 100, 300 enters into the manual adjustment mode.

Figure 10:
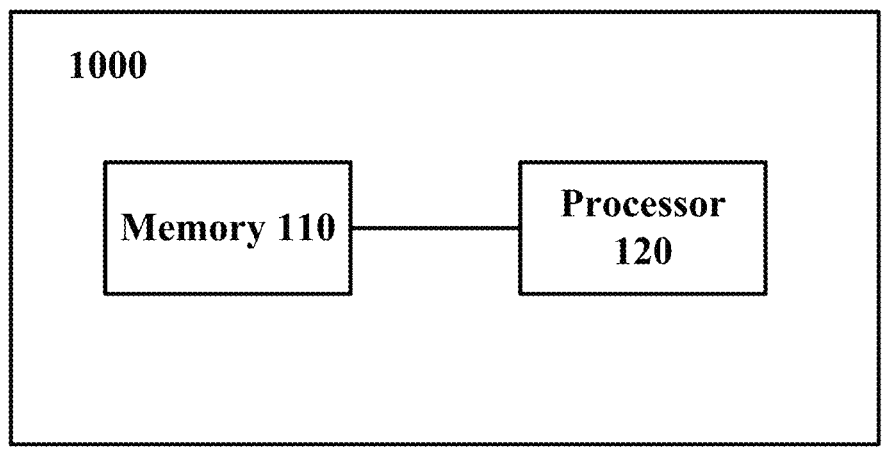
FIG. 10 shows a schematic block diagram of a computing device for implementing the dimming control in accordance with the disclosure.

FIG. 10 illustrates a computing device 1000 for executing the dimming control in accordance with the disclosure. The computing device 1000 may include a memory 1100 and a processor 1200 coupled to memory 1100. The memory 1100 is for storing instructions executable by the processor 1200, and the processor 1200 is configured to execute the instructions stored in the memory 1100 to implement the various operations and functions described in connection with FIGS. 1-9.

It should be understood that the computing device 1000 is a device having computing capability, such as a computer, a smartphone, etc. The computing device 1000 according to the embodiments of the disclosure may be implemented in hardware or dedicated circuits, software, firmware, logic, or any combination thereof. Some aspects may be implemented in hardware, while others may be implemented in firmware or software that can be executed by controllers, microprocessors or other computing devices. In some embodiments, the memory 1100 may be implemented with a portable computer disk, hard disk, random memory access (RAM), read-only memory (ROM), erasable programmable read-only memory (EPROM or Flash memory), optical storage device, magnetic storage device, cloud storage or any suitable combination thereof. In some embodiments, processor 1200 may be implemented by any combination of general purpose processor, digital signal processor (DSP), application specific integrated circuit (ASIC), field programmable gate array (FPGA) or other programmable logic devices, discrete gate or transistor logic, discrete hardware components, etc. The general purpose processor may be a microprocessor, and the processor may be any general processor, controller, microcontroller or state machine. Processors may also be implemented as combinations of computing devices, such as a combination of DSP and microprocessors, multiple microprocessors, one or more microprocessors combined with the DSP core, or any other such configuration.

According to the disclosure, a machine readable storage medium is provided. The machine readable storage medium may have instructions (i.e., elements implemented in software form as described above), when executed by the machine, enable the machine to perform various operations and functions of various embodiments of the disclosure.

In this case, the program code read from the machine readable storage medium can realize the functions of any of the embodiments as described above, so the machine readable code and the readable storage medium storing the machine readable code form a part of the disclosure.

The machine readable storage media may include, for example, floppy disks, hard disks, magneto-optical disks, optical disks (such as CD-ROM, CD-R, CD-RW, DVD-ROM, DVD-RAM, DVD-RW, DVD-RW), tapes, non-volatile memory cards and ROMs, and any suitable combination of the above. Optionally, the program code may be downloaded from the server or cloud via a communication network.

Other Variants

It should be understood that in the disclosure, the interaction units 130, 330 have various implementations. For example, in addition to the touch mode as described above, the interaction unit 130, 330 may also include one or more of: light sensor, gesture sensor, audio sensor, operation button, operation handle, etc. The interaction unit 130, 330 may also include other suitable forms according to the application scenarios of the glass structure 100 and the glass structure 300. Hereinafter, taking the interaction unit 130 as an example, implementations of the interaction unit are described.

In some embodiments, the interaction unit 130 includes a light sensor. The light sensor may be disposed, for example, on the outside of the glass structure 100, that is to say, closer to the light incident side. The light sensor senses the intensity level of the surrounding environment of the glass structure 100 and provides an adjusting signal based on the sensed intensity level. For example, when the intensity level is relatively large, that is, when the light intensity of the surrounding environment is large, the glass structure 100 is adjusted to a state of being more opaque or having a smaller light transmittance under the control of the adjusting signal. On the other hand, when the intensity level is relatively small, that is, when the light intensity of the surrounding environment is weak, the glass structure 100 is adjusted to a state of being more transparent or having a higher light transmittance under the control of the adjusting signal.

In some embodiments, the interaction unit 130 includes a gesture sensor. The gesture sensor senses the non-contact gesture from the user and provides the adjusting signal based on the gesture. In this embodiment, the user can use rich and flexible gestures to indicate various dimming requirements, thereby realizing more flexible dimming control.

In some embodiments, the interaction unit 130 includes an audio sensor. The audio sensor senses the voice from the user and provides the adjusting signal based on the voice. In this embodiment, the user does not need to perform any manual operation, and can conveniently and quickly complete the interaction of adjusting instructions while doing other work.

In some embodiments, the interaction unit 130 includes a knob, such as a virtual knob. The user may rotate the knob to indicate dimming requirements (e.g., dimming trends or dimming ranges). For example, the interaction unit 130 may provide an adjusting signal according to the direction and angle of the rotation operation.

In some embodiments, the interaction unit 130 includes an operating handle. The user may push the operating handle towards in four directions including up, down, right, and left directions to indicate dimming requirements. The interaction unit 130 may provide an adjusting signal according to the number and direction of the push operations.

It should be pointed out that not all the steps and units in the above mentioned processes and structure diagrams are necessary, and some steps or units can be ignored according to actual needs. The execution sequence of the steps is not fixed and can be adjusted according to actual need. The device structure described in the above embodiments may be a physical structure or a logical structure, i.e., some units may be implemented by the same physical entity, or some units may be implemented by multiple physical entities, or may be implemented by some components of multiple independent devices. In the above embodiments, hardware units or modules may be implemented by mechanical or electrical means. For example, a hardware unit, module or processor may include a permanent dedicated circuit or logic (such as a dedicated processor, FPGA or ASIC) to perform the corresponding operations. Hardware units or processors can also include programmable logic or circuits (such as general purpose processors or other programmable processors), which can be temporarily set up by software to perform corresponding operations. Specific implementations (mechanical, or dedicated permanent circuits, or temporary circuits) can be determined based on cost and time considerations. The specific embodiments described in connection with the accompanying drawings are exemplary embodiments, and do not represent all the embodiments that can be implemented or fall within the protection scope of the claims. The term "exemplary" used throughout the specification means "serving as an example, instance, or illustration" and does not mean "preferred" or "having advantages" over other embodiments. For the purpose of providing an understanding of the described techniques, specific embodiments include specific details. However, these technologies can be implemented without these specific details. In some examples, in order to avoid making the concepts of the described embodiments difficult to understand, well-known structures and devices are shown in block diagram form.

The above description of the disclosure is provided to enable a person in the art to implement or use the disclosure. Various variants to the disclosure are obvious to the person in the art, and the general principles defined herein can also be applied to other variants without departing from the protection scope of the disclosure. Therefore, the disclosure is not limited to the examples and designs described herein, but consistent with the broadest scope consistent with the principles and novelty features disclosed herein.

The invention claimed is:

1. A glass structure comprising:
a glass body;
a modulating unit coupled to the glass body and configured to modulate optical characteristics of the glass structure;
an interaction unit coupled to the glass body and configured to provide an adjusting signal which indicates an execution of adjusting the optical characteristics of the glass structure; and
a control unit coupled to the modulating unit and the interaction unit respectively, the control unit being configured to receive the adjusting signal from the interaction unit and to control the modulating unit to modulate the optical characteristics of a target region of the glass structure in response to the adjusting signal;
wherein the interaction unit and the modulating unit are isolated from each other by a filling material arranged therebetween, a transmittance of the filling material is equal to or greater than about 50%, the relative permittivity of the filling material being equal to or less than about 10, and the thickness of the filling material being equal to or greater than about 50 μm,
wherein the glass structure further comprises:
a detecting unit configured to detect environmental parameters and to provide a detection signal, which indicates the environmental parameters, to the control unit,
wherein the control unit is further configured to determine whether a first condition, which is adapted to indicate that the interaction unit is disabled, is satisfied,
if the result of the determining step for the first condition is negative, the control unit controls the modulating unit to modulate the optical characteristics of the target region of the glass structure in response to the adjusting signal; and
if the result of the determining step for the first condition is affirmative, the control unit controls the modulating unit to modulate the optical characteristics of the target region of the glass structure in response to the detection signal.

2. The glass structure according to claim 1, wherein in the condition that the control unit determines that the first condition is satisfied, the control unit is further configured to determine whether a second condition, which is adapted to indicate that the interaction unit is enabled, is satisfied,
if the result of the determining step for the second condition is negative, the control unit controls the modulating unit to modulate the optical characteristics of the target region of the glass structure in response to the detection signal, and
if the result of the determining step for the second condition is affirmative, the control unit controls the modulating unit to modulate the optical characteristics of the target region of the glass structure in response to the adjusting signal.

3. The glass structure according to claim 1, wherein the modulating unit further comprises an electronically-controlled dimming unit, and
the control unit is configured to in response to the adjusting signal, apply an electrical signal to the electronically-controlled dimming unit to change the optical characteristics of the electronically-controlled dimming unit such that the optical characteristics of the target region of the glass structure are adjusted.

4. The glass structure according to claim 3, wherein the control unit is configured to execute at least one of:

applying an electrical signal which is varied continuously to the electronically-controlled dimming unit such that the optical characteristics of the target region of the glass structure are adjusted continuously;

applying an electrical signal which is varied in a stepwise manner to the electronically-controlled dimming unit such that the optical characteristics of the target region of the glass structure are adjusted in the stepwise manner; and applying an electrical signal with a predetermined amplitude to the electronically-controlled dimming unit such that that the optical characteristics of the target region of the glass structure are adjusted to the predetermined amplitude.

5. The glass structure according to claim 3, wherein the electronically-controlled dimming unit comprises one or more of a polymer dispersed liquid crystal (PDLC) unit, a suspended particle device (SPD) unit and an electrochromism (EC) unit.

6. The glass structure according to claim 5, wherein an edge of the electronically-controlled dimming unit is sealed by an isolation material, and the isolation material is selected from one or more of polyethylene terephthalate (PET), polyvinyl chloride (PVC), polyethylene (PE) and poly tetra fluoroethylene (PTFE).

7. The glass structure according to claim 1, wherein the glass body comprises a first glass substrate and a second substrate, and the modulating unit and the interaction unit are arranged between the first glass substrate and the second substrate.

8. The glass structure according to claim 7, wherein the glass structure further comprises:

a first adhesive layer arranged between the first glass substrate and the modulating unit; and a second adhesive layer arranged between the second glass substrate and the interaction unit.

9. The glass structure according to claim 8, wherein a portion or the entire of the first adhesive layer is tinted; and/or a portion or the entire of the second adhesive layer is tinted.

10. The glass structure according to claim 1, wherein the interaction unit comprises any one or more of a touching device, an optical sensor, a gesture sensor, an audio sensor, an operation button and an operating handle.

11. The glass structure according to claim 1, wherein the detecting unit comprises any one or more of an optical sensor and a temperature sensor.

12. The glass structure according to claim 1, wherein the first condition to be satisfied comprises any one or more of:

a first triggering signal, which indicates that the interaction unit is disabled, is received from the interaction unit;

a detection signal, the intensity of which reaches a predetermined intensity, is received from the detecting unit; and the adjusting signal for a predetermined period is not received from the interaction unit.

13. The glass structure according to claim 2, wherein the second condition to be satisfied comprises:

a second triggering signal, which indicates that the interaction unit is enabled, is received from the interaction unit.

14. The glass structure according to claim 1, wherein the optical characteristics of the glass structure comprise one or more of a haze of the glass structure, a transmittance of the glass structure and a tint of the glass structure.

15. A glass structure comprising:

a glass body;

a modulating unit coupled to the glass body and configured to modulate optical characteristics of the glass structure;

an interaction unit coupled to the glass body and configured to provide an adjusting signal which indicates an execution of adjusting the optical characteristics of the glass structure; and a first interface configured to couple with a control unit, and the control unit being configured to receive an adjusting signal from the interaction unit and to control the modulating unit to modulate the optical characteristics of a target region of the glass structure in response to the adjusting signal;

wherein the interaction unit and the modulating unit are isolated from each other by a filling material arranged therebetween, a transmittance of the filling material is equal to or greater than about 50%, the relative permittivity of the filling material being equal to or less than about 10, and the thickness of the filling material being equal to or greater than about 50 μm, wherein the glass structure further comprises:

a second interface configured to couple with a detecting unit, and the detecting unit being configured to detect environmental parameters and to provide a detection signal, which indicates the environmental parameters, to the control unit, wherein the control unit is further configured to determine whether a first condition, which is adapted to indicate that the interaction unit is disabled, is satisfied, if the result of the determining step for the first condition is negative, the control unit controls the modulating unit to modulate the optical characteristics of the target region of the glass structure in response to the adjusting signal; and if the result of the determining step for the first condition is affirmative, the control unit controls the modulating unit to modulate the optical characteristics of the target region of the glass structure in response to the detection signal.

16. The glass structure according to claim 15, wherein in the case that the control unit determines that the first condition is satisfied, the control unit is further configured to determine whether a second condition, which is adapted to indicate that the interaction unit is enabled, is satisfied, if the result of the determining step for the second condition is negative, the control unit controls the modulating unit to modulate the optical characteristics of the target region of the glass structure in response to the detection signal, and if the result of the determining step for the second condition is affirmative, the control unit controls the modulating unit to modulate the optical characteristics of the target region of the glass structure in response to the adjusting signal.

17. A vehicle window, wherein the vehicle window comprises the glass structure according to claim 1.

18. A method for adjusting optical characteristics of a glass structure, the glass structure comprising a glass body, a modulating unit and an interaction unit, the method comprising:

receiving an adjusting signal which indicates an execution of adjusting the optical characteristics of the glass structure, from the modulating unit; and controlling the modulating unit to modulate the optical characteristics of a target region of the glass structure in response to the adjusting signal, wherein the glass structure further comprises a detecting unit, and the method further comprises the steps of:

determining whether a first condition, which is adapted to indicate that the interaction unit is disabled, is satisfied, if the result of the determining step for the first condition is negative, controlling the modulating unit to modulate the optical characteristics of the target region of the glass structure in response to the adjusting signal; and if the result of the determining step for the first condition is affirmative, controlling the modulating unit to modulate the optical characteristics of the target region of the glass structure in response to the detection signal.

19. The method according to claim 18, wherein the method further comprises:

in the case that the control unit determines the first condition is satisfied, determining whether a second condition, which is adapted to indicate that the interaction unit is enabled, is satisfied, if the result of the determining step for the second condition is negative, controlling the modulating unit to modulate the optical characteristics of the target region of the glass structure in response to the detection signal, and if the result of the determining step for the second condition is affirmative, controlling the modulating unit to modulate the optical characteristics of the target region of the glass structure in response to the adjusting signal.

20. A computing apparatus comprising a memory, a processor and instructions stored in the memory and executed by the processor, wherein the processor executes the instructions to realize the method according to claim 18.

21. A non-transitory machine readable storage medium on which executable instructions are stored, wherein the executable instructions, when executed, cause the machine to perform the steps of the method according to claim 18.

* * * * *